United States Patent
Alecu (10) Patent No.: US 10,224,848 B2
(45) Date of Patent: Mar. 5, 2019

(54) METHOD AND SYSTEM FOR SYNCHRONIZING GENERATORS

(71) Applicant: PRATT & WHITNEY CANADA CORP., Longueuil (CA)

(72) Inventor: Daniel Alecu, Brampton (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 15/418,856

(22) Filed: Jan. 30, 2017

(65) Prior Publication Data

US 2018/0219502 A1 Aug. 2, 2018

(51) Int. Cl.
| | |
|---|---|
| *H02P 9/06* | (2006.01) |
| *F01D 15/10* | (2006.01) |
| *F01D 15/12* | (2006.01) |
| *F02B 63/04* | (2006.01) |
| *H02K 7/116* | (2006.01) |

(Continued)

(52) U.S. Cl.
CPC .............. *H02P 9/06* (2013.01); *F01D 15/10* (2013.01); *F01D 15/12* (2013.01); *F02B 63/042* (2013.01); *F02C 7/268* (2013.01); *F02C 7/32* (2013.01); *F02N 11/006* (2013.01); *F02N 11/04* (2013.01); *H02J 1/06* (2013.01); *H02J 3/40* (2013.01); *H02K 7/116* (2013.01); *H02K 7/1815* (2013.01); *H02K 7/1823* (2013.01); *H02P 9/02* (2013.01); *F05D 2220/323* (2013.01); *F05D 2220/76* (2013.01); *F05D 2270/061* (2013.01)

(58) Field of Classification Search
CPC ... H02P 9/06; H02P 9/02; F01D 15/10; F01D 15/12; F02B 63/042; F02C 7/268; F02C 7/32; F02N 11/006; F02N 11/04; H02J 1/06; H02J 3/40; H02K 7/116; H02K 7/1815; H02K 7/1823
See application file for complete search history.

(56) References Cited

U.S. PATENT DOCUMENTS

| | | | | |
|---|---|---|---|---|
| 3,611,080 | A | * | 10/1971 | Herzog .................. H02P 5/747 310/165 |
| 4,208,620 | A | * | 6/1980 | Ringland ............... H02P 5/747 318/111 |

(Continued)

FOREIGN PATENT DOCUMENTS

JP S5763435 4/1982

OTHER PUBLICATIONS

European Patent Office, Extended European Search Report, dated Jun. 25, 2018, 5 pages, Application No. 18154153.3.

*Primary Examiner* — Viet Nguyen
(74) *Attorney, Agent, or Firm* — Norton Rose Fulbright Canada LLP (57) ABSTRACT

There are described methods and systems for synchronizing at least two generators for an engine. A first generator is mechanically coupled to the engine. A power source is connected in parallel to the first generator and to a second generator, the second generator mechanically uncoupled from the engine, the power source connected across a same respective phase of a stator in the first generator and the second generator. Power from the power source is applied to the first generator and the second generator to align a respective rotor to the respective phase in each generator and cause the first generator and the second generator to be in-phase. The second generator is then mechanically coupled to the engine.

15 Claims, 6 Drawing Sheets

(51) Int. Cl.
*H02K 7/18* (2006.01)
*F02N 11/00* (2006.01)
*F02N 11/04* (2006.01)
*F02C 7/268* (2006.01)
*F02C 7/32* (2006.01)
*H02J 1/06* (2006.01)
*H02J 3/40* (2006.01)
*H02P 9/02* (2006.01)

(56) References Cited

U.S. PATENT DOCUMENTS

| | | | | |
|---|---|---|---|---|
| 6,072,303 A | * | 6/2000 | Nickoladze | H02K 19/26 322/20 |
| 6,250,278 B1 | * | 6/2001 | Mekler | F01C 1/28 123/241 |
| 7,405,542 B1 | * | 7/2008 | McAvoy | H02P 5/747 322/14 |
| 7,538,524 B2 | * | 5/2009 | Sullivan | H02K 1/02 310/154.01 |
| 7,692,335 B2 | * | 4/2010 | Michalko | H02K 7/003 307/84 |
| 7,971,499 B2 | | 7/2011 | Herlihy et al. | |
| 2006/0061336 A1 | | 3/2006 | Anghel et al. | |
| 2007/0040383 A1 | * | 2/2007 | Mehl | F02N 11/006 290/36 R |
| 2007/0296215 A1 | * | 12/2007 | Dooley | F02C 7/268 290/28 |
| 2008/0073979 A1 | * | 3/2008 | Wiegman | H02J 3/46 307/84 |
| 2009/0039652 A1 | * | 2/2009 | Trainer | F01D 15/10 290/46 |
| 2013/0168960 A1 | * | 7/2013 | Kalinka | H02P 11/00 290/7 |
| 2015/0005129 A1 | * | 1/2015 | Lee | B60K 6/42 475/5 |
| 2015/0180393 A1 | * | 6/2015 | Tesch | H02P 9/007 307/87 |

* cited by examiner

METHOD AND SYSTEM FOR SYNCHRONIZING GENERATORS

TECHNICAL FIELD

The disclosure relates generally to the synchronization of generators and more particularly, to the phase-alignment of two or more generators.

BACKGROUND OF THE ART

In an alternating current electric power system, synchronization is the process of matching the frequency and speed of a generator to a power grid. An AC generator cannot deliver power to the power grid unless it is running at the same frequency as the grid.

When the power grid has two or more generators connected thereto, or two generators are provided on separate power grids but there may be a transfer of power between the two generators, the generators also need to be synchronized together in frequency and phase. Poor phase matching can lead to high transient torque with high currents, which can damage the windings of the generator, and high instant voltages, which can damage the insulation of the equipment.

The typical power plant arrangement of an aircraft is one generator per driving unit, whether for a diesel engine, a gas turbine engine or a steam turbine. Driving two generators through the same gear box, thus mechanically interconnected, requires mechanical phase matching between the twin generators. There is a need to improve on the existing methods for synchronizing generators together.

SUMMARY

In one aspect, there is provided a method for synchronizing at least two generators for an engine. A first generator is mechanically coupled to the engine. A power source is connected in parallel to the first generator and to a second generator, the second generator mechanically uncoupled from the engine, the power source connected across a same respective phase of a stator in the first generator and the second generator. Power from the power source is applied to the first generator and the second generator to align a respective rotor to the respective phase in each generator and cause the first generator and the second generator to be in-phase. The second generator is then mechanically coupled to the engine.

In another aspect, there is provided a system for synchronizing at least two generators for an engine. The system comprises a first generator, a second generator mechanically uncoupled from the engine, and a power source connected in parallel to the first generator and the second generator across a same respective phase of a stator in the first generator and the second generator, the power source operable to apply power to the first generator and the second generator to align a respective rotor to the respective phase in each generator and cause the first generator and the second generator to be in-phase.

DESCRIPTION OF THE DRAWINGS

Reference is now made to the accompanying figures in which.

DETAILED DESCRIPTION

Figure 1:
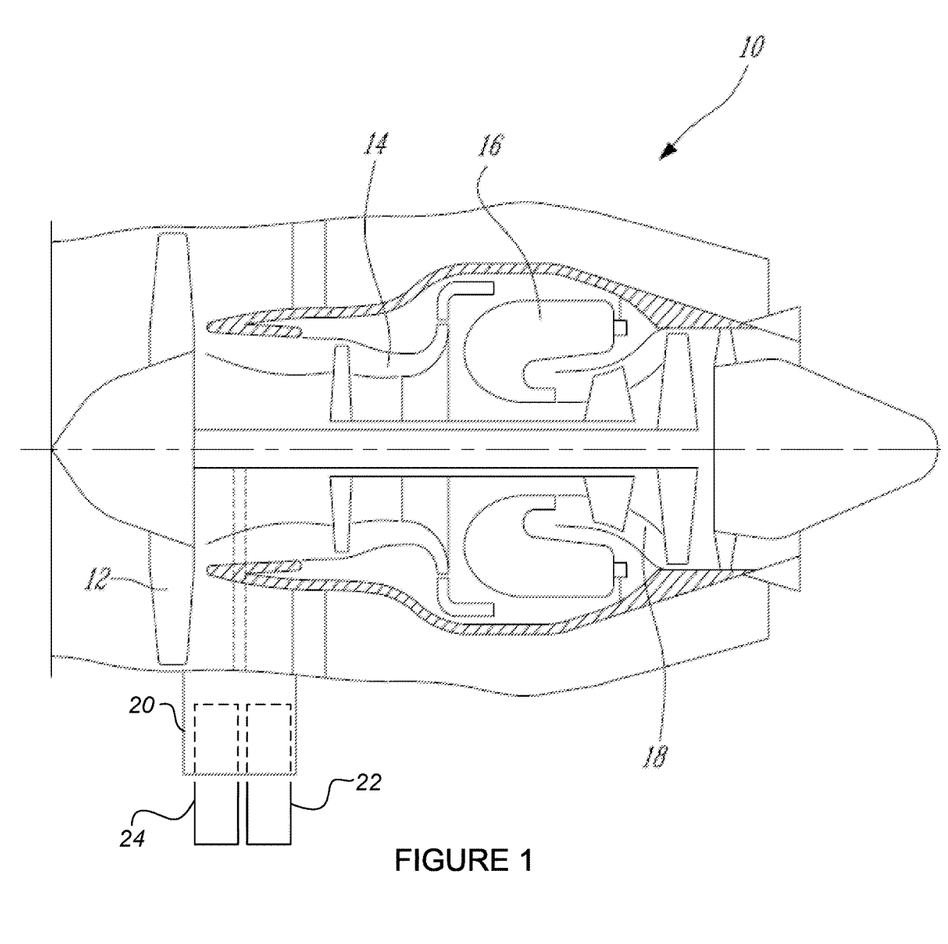
FIG. 1 is a schematic cross-sectional view of a gas turbine engine.

FIG. 1 illustrates a gas turbine engine 10 of a type preferably provided for use in subsonic flight, generally comprising in serial flow communication a fan 12 through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases. Engine 10 is illustrated as a turbofan engine but may be any other type of gas turbine engine, such as turboprop and turboshaft, or any other type of engine or motor, such as a diesel engine. The engine 10 may be an aircraft engine, an automobile engine, a power plant engine, and the like. In the case of an aircraft engine, engine 10 may be a main engine or an auxiliary power unit. Other embodiments may also apply.

A gearbox 20 forms part of the gas turbine engine 10 and is used to drive accessories such as fuel pumps, oil pumps, engine starters, and generators. Two generators 22, 24 are fitted into the gearbox 20 for converting mechanical energy from the engine 10 into electrical energy. The engine 10 drives the gearbox 20 which in turn drives the generators 22, 24. The two generators 22, 24 may feed separate power grids of an aircraft electrical power system, or they may be used on a same power grid. The gearbox 20 mechanically links together the generators 22, 24, causing them to rotate at a same frequency.

Figure 2:
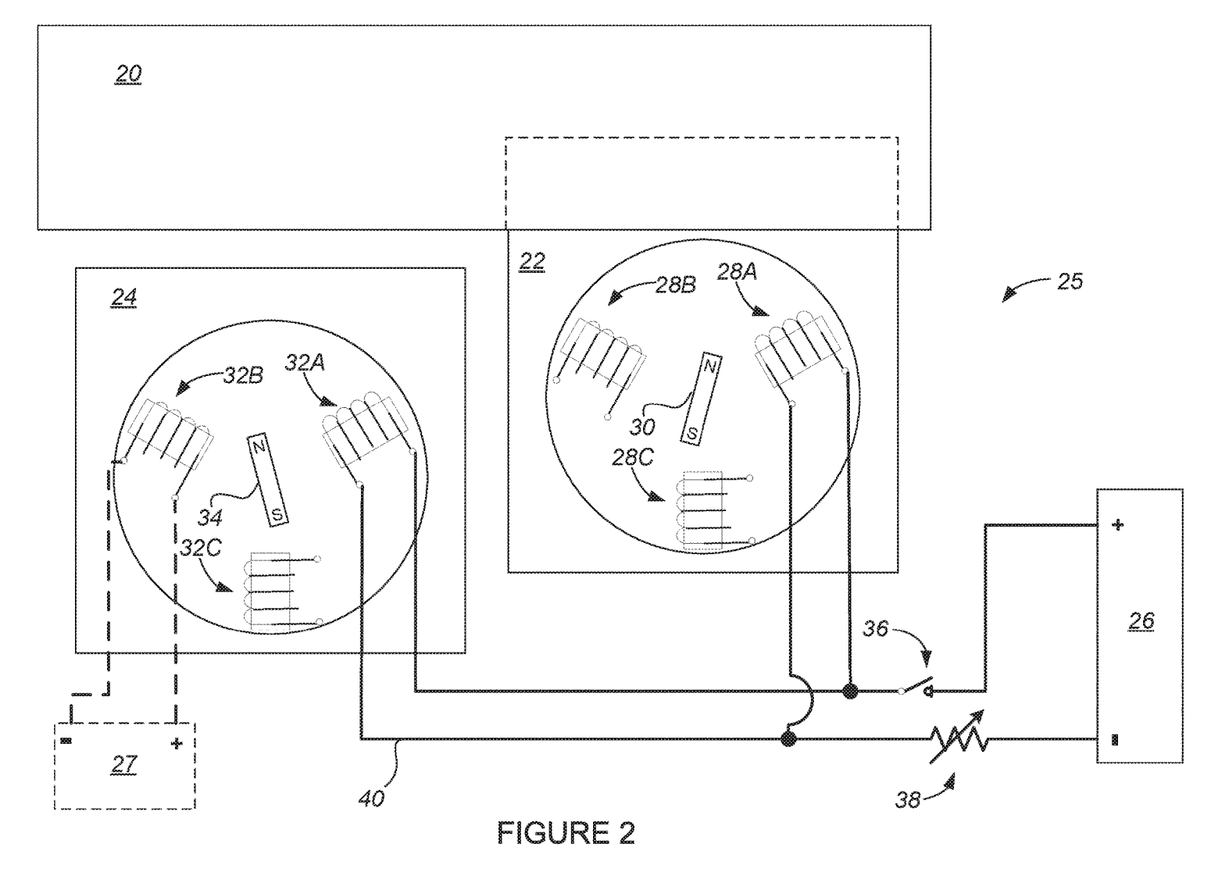
FIG. 2 is a schematic view of a system for synchronizing two generators in phase, before synchronization.

FIG. 2 illustrates an example system 25 for synchronizing at least two generators, such as generator 22 and generator 24. Generator 22 is mechanically coupled to engine 10 via gearbox 20. Generator 24 is mechanically uncoupled from gearbox 20 and engine 10. Note that gearbox 20 is one embodiment by which the generators 22, 24 may be mechanically coupled to the engine 10. Those skilled in the art will recognize that alternative structures may also be used.

Generators 22, 24 are illustrated as polyphase generators, and more specifically 3-phase generators, but may also be single-phase or contain any other number of phases suitable for the application for which they are intended. In some embodiments, generators 22 and 24 are identical.

In the embodiment illustrated, the stator of generator 22 has three electromagnets 28a, 28b, 28c, each one composed of a solenoid wrapped around a conductive core. The rotor of generator 22 is composed of a magnet 30, having a north pole (N) and a south pole (S). The stator of generator 24 has three electromagnets 32a, 32b, 32c, each one composed of a solenoid wrapped around a conductive core. The rotor of generator 24 is composed of a magnet 34, having a north pole (N) and a south pole (S). Each electromagnet represents a respective phase of a corresponding generator. Electromagnets 28a, 32a correspond to a first phase, electromagnets 28b, 32b correspond to a second phase, and electromagnets 28c, 32c correspond to a third phase. In some embodiments, the windings on each pair of electromagnets 28a, 32a, 28b, 32b, and 28c, 32c have a same indexing.

A power source 26 is connected in parallel to generator 22 and generator 24 while generator 22 is mechanically coupled to the gearbox 20 and generator 24 is mechanically uncoupled from the gearbox 20. Note that generator 22 may also be mechanically uncoupled from the gearbox 20 at this stage, but only the embodiment with generator 22 mechanically coupled to the gearbox 20 is illustrated for simplicity. The power source 26 may be any type of device capable of supplying electric energy to a load, including stand-alone devices and devices built into larger devices. For example, the power source 26 may be a battery, a fuel cell, a generator, an alternator, a solar power converter, and the like. The power source 26 may be independent from the engine 10 and/or from an aircraft in which the engine 10 is installed.

Note that the power source 26 is connected across a same phase in both generators 22 and 24, namely electromagnets 28a and 32a. Alternatively, power source 26 may be connected across electromagnets 28b and 32b, or across electromagnets 28c and 32c. Cables 40 are used to connect the positive terminal of power source 26 to a first end of the solenoid forming electromagnet 28a and a first end of the solenoid forming electromagnet 32a, and to connect the negative terminal of power source 26 to a second end of the solenoid forming electromagnet 28a and a second end of the solenoid forming electromagnet 32a. The same respective ends of electromagnets 28a, 32a are connected to the positive and negative terminals of the power source 26, respectively. Any type of suitable wiring may be used for cables 40.

In some embodiments, a switching device 36 is provided in the path between the power source 26 and the generators 22, 24, to selectively open and close the circuit. Alternatively, the act of connecting cables 40 to either end of the circuit, i.e. the battery terminals at one end and the electromagnets 28a, 32a at the other end, serves the same function as switching device 36. In other words, one or both ends of the circuit may be left unconnected until power is to be applied from the power source 26 to the generators 22, 24.

In some embodiments, a variable resistor 38 is provided in the path between the power source 26 and the generators 22, 24 to modulate the power applied from the power source 26 to the generators 22, 24. Alternatively, power modulation may be performed manually, for example by limiting the amount of time during which the cables are connected to the power source 26 and/or the generators 22, 24 or by connecting the cables 40 intermittently. Also alternatively, the power source 26 may have a power modulating function integrated therein.

Figure 3:
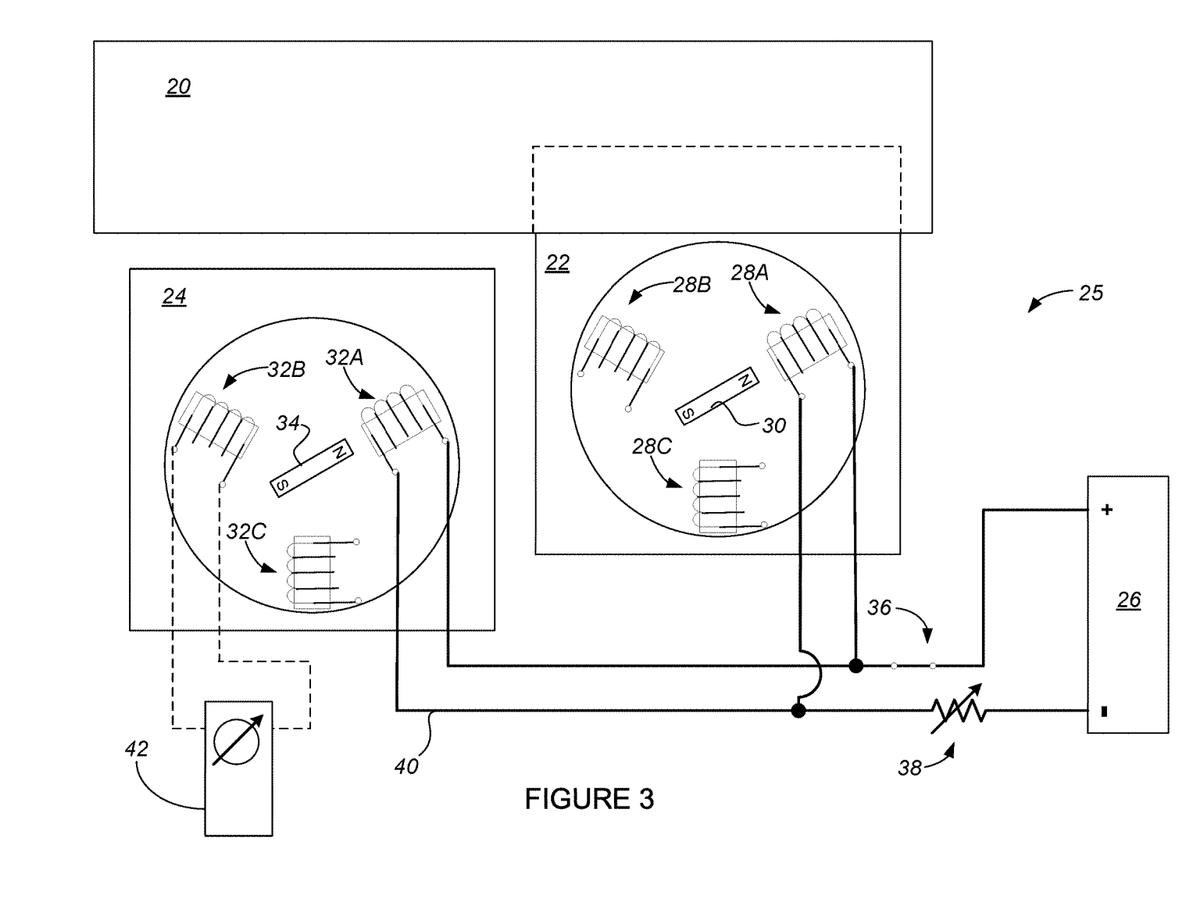
FIG. 3 is a schematic view of the system of FIG. 2, after phase synchronization.

When the circuit is closed, either by closing switch 36 or by suitably connecting all ends of the cables 40, power is applied across the respective electromagnets 28a, 32a of the generators 22, 24, causing the respective magnets 30, 34 to rotate to a position whereby the north pole of each magnet 30, 34 is aligned with the electromagnet 28a, 32a to which the power is applied. An example is illustrated in FIG. 3. Magnet 30 has rotated to align its north pole with electromagnet 28a, and magnet 34 has rotated to align its north pole with electromagnet 32a. Note that if the positive and negative terminals of the power source 26 were inversed, the south pole of each magnet 30, 34 would point towards the respective electromagnet 28a, 32a. When magnets 30 and 34 are aligned in a same position in both generators 22, 24, the generators 22, 24 are in-phase.

In some embodiments, one or more impedance meter 42 is used to confirm that the rotors 30, 34 have stopped rotating and are fixed. The impedance meter 42 may also be used to confirm that the same impedance can be read across electromagnet 28a and electromagnet 32a. A single impedance meter 42 may be alternately connected to an electromagnet of generator 22 and an electromagnet of generator 24. Alternatively, two impedance meters 42 may be used, one connected to each generator 22, 24. Impedance may be measured across the same electromagnet to which power is applied, namely electromagnets 28a, 32a, or to one of the other electromagnets in the generator (as illustrated). Any type of impedance measuring instrument may be used, such as a multimeter or an LCR meter.

Figure 4:
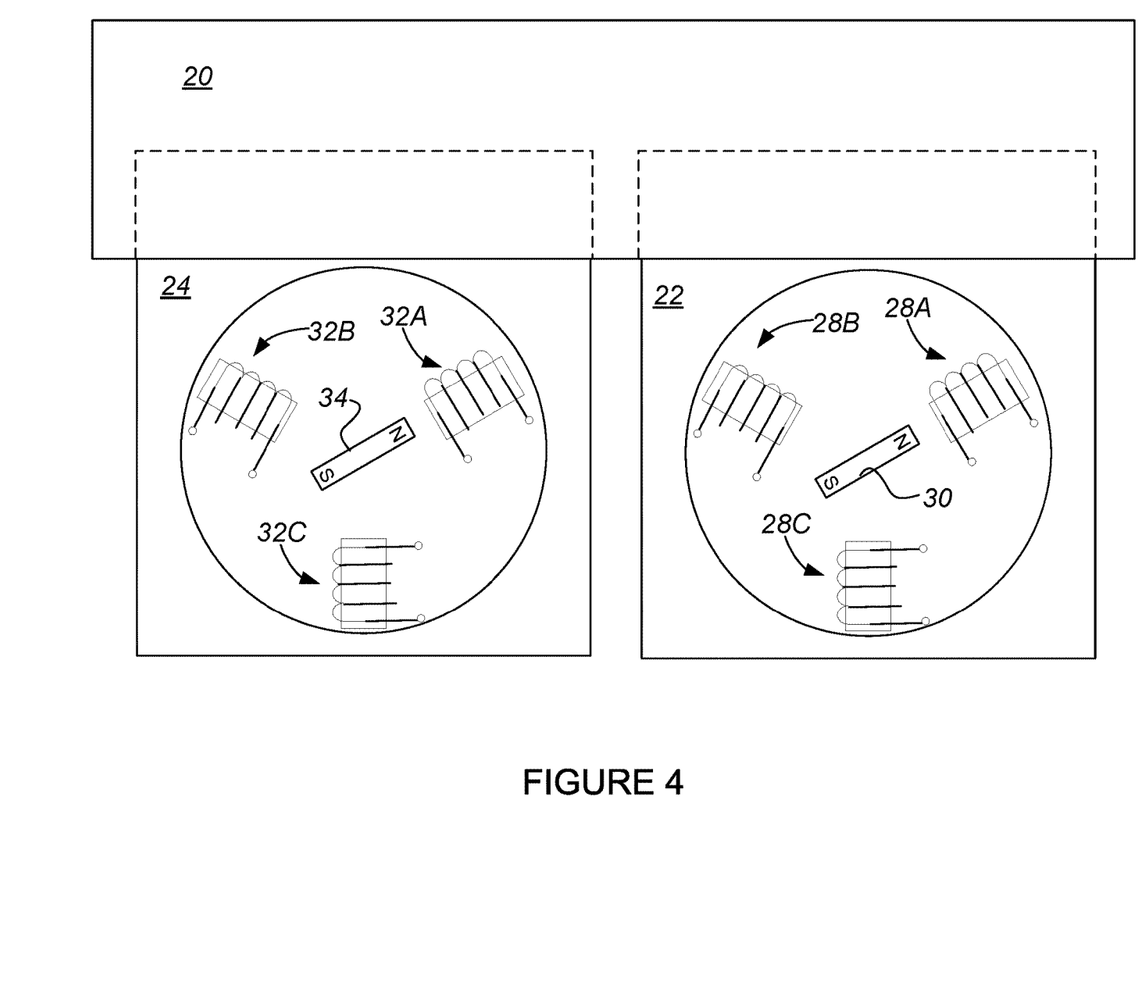
FIG. 4 is a schematic view of the synchronized generators mechanically coupled to the engine.

Turning to FIG. 4, once the generators 22, 24 are aligned in phase, generator 24 is then mechanically coupled to engine 10 via gearbox 20. As stated above, the mechanical coupling will allow the generators 22, 24 to be aligned in frequency when the engine is started, as both generators 22, 24 will be rotated together via gearbox 20. Cables 40 may be removed from generators 22, 24 before or after generator 24 is mechanically coupled to the engine 10.

Figure 5A:
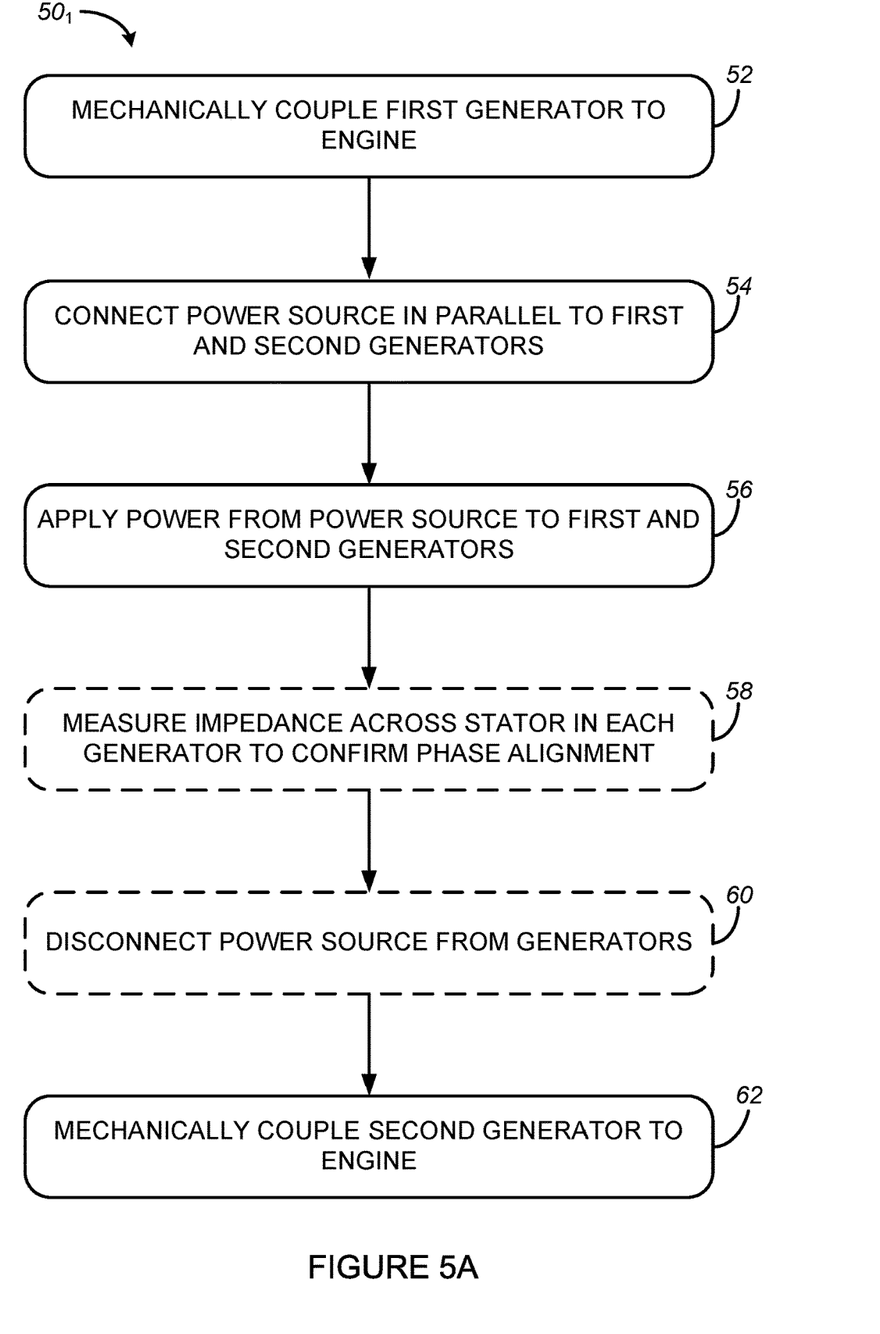
FIGS. 5A-5B are flowcharts of example methods for synchronizing at least two generators for an engine.
Figure 5B:
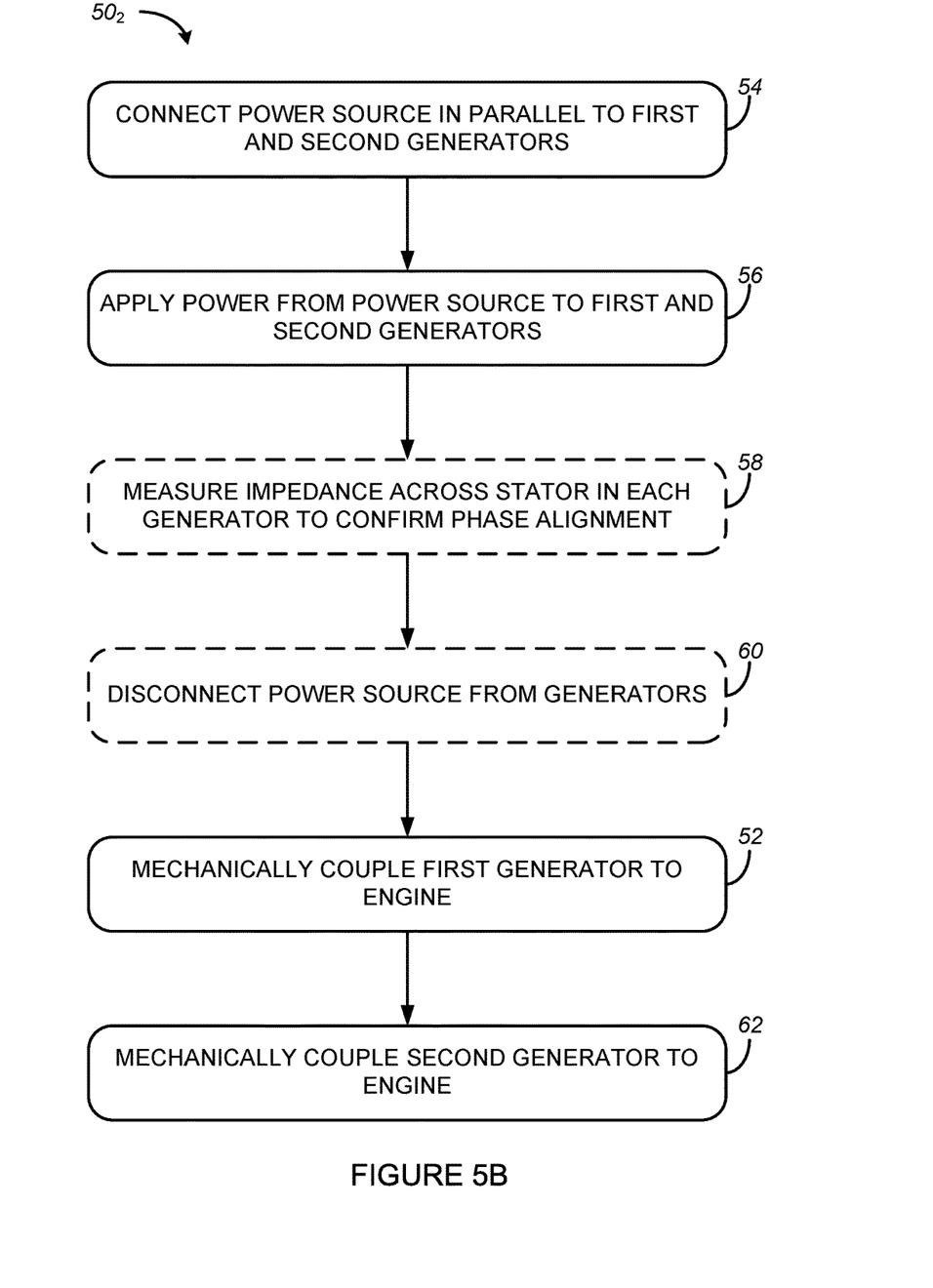

FIGS. 5A and 5B are flowcharts of example methods $50_1$, $50_2$ for synchronizing at least two generators for an engine, such as generators 22, 24 for engine 10. With reference to FIG. 5A and method $50_1$, at 52 the first generator is mechanically coupled to the engine. As stated above, mechanically coupling the first generator may comprise fitting the first generator to a gearbox of the engine. Alternatively, another structural device may be used to couple the engine and generator so as to have the shaft of the engine and the rotor of the generator rotate together.

At 54, a power source, such as power source 26, is connected in parallel to the first generator and the second generator, across a same respective phase of a stator in both generators. In some embodiments, the power source is a battery external to the engine.

At 56, power from the power source is applied to the first generator and the second generator to align the rotor of each generator with its own stator. In some embodiments, this comprises closing a switch connected between the power source and the first generator and second generator. In some embodiments, a variable resistor may also be adjusted until the rotors of each generator rotates to a fixed position.

Optionally at 58, impedance is measured across the phase of the stator in each generator in order to confirm phase alignment between the two generators. This may be done using one or two impedance measuring devices. Also optionally at 60, the power source is disconnected from the first generator and the second generator once the two generators are aligned in phase.

At 62, the second generator is mechanically coupled to the engine, for example via the same gearbox as the first generator. The two generators are then synchronized as they are aligned in both frequency and in phase.

With reference to FIG. 5B and method $50_2$, the power source is connected in parallel to the first and second generators while both the first generator and the second generator are mechanically uncoupled from the engine. Mechanically coupling the first generator to the engine, as per 52, may thus be performed later in the method $50_2$, such as before mechanically coupling the second generator to the engine at 62 as illustrated. Also alternatively, mechanically coupling the first generator to the engine may be performed after mechanically coupling the second generator to the engine at 62, or after connecting the power source in parallel to the first and second generators at 54, or after applying power from the power source to the first and second generators at 56.

In some embodiments, the generators are aligned to a non-zero phase. This may be done, for example, by connecting a second power source to a second phase of at least one of the two generators. For example, referring back to FIG. 2, a second power source 27 may be connected across electromagnet 32b in generator 24. When power is applied to electromagnets 32a and 32b in generator 24, magnet 34 will rotate to a position located between the two electromagnets 32a, 32b. Having magnet 30 and magnet 34 set to different positions causes the desired non-zero phase alignment. This may be done, for example, in an effort to create a different loading between generators 22, 24.

Other embodiments for zero and/or non-zero phase alignment are also contemplated. For example, the second power source 27 may be connected across electromagnet 32b in generator 24 and across electromagnet 28b in generator 22. Power may then be applied so as to cause magnets 30, 34 to rotate to a same position located substantially centrally between electromagnets 28b, 28a and 32b, 32a, respectively. A shift left to either of the two magnets 30, 34 can set the phase difference between the two generators to a negative non-zero value. A shift right to either of the two magnets 30, 34 can set the phase difference to a positive non-zero value.

The method and system may be performed as the time of installation of an engine and/or at engine maintenance.

The above description is meant to be exemplary only, and one skilled in the art will recognize that changes may be made to the embodiments described without departing from the scope of the invention disclosed. For example, the single gearbox 20 may be two separate gearboxes that are mechanically coupled together. Still other modifications which fall within the scope of the present invention will be apparent to those skilled in the art, in light of a review of this disclosure, and such modifications are intended to fall within the appended claims.

The invention claimed is:

1. A method for synchronizing at least two generators for an engine, the method comprising:
   mechanically coupling the first generator to the engine;
   connecting a power source in parallel to the first generator and to a second generator, the second generator mechanically uncoupled from the engine, the power source connected across a same respective phase of a stator in the first generator and the second generator;
   applying power from the power source to the first generator and the second generator to align a respective rotor to the respective phase in each generator and cause the first generator and the second generator to be in-phase; and
   mechanically coupling the second generator to the engine.

2. The method of claim 1, wherein mechanically coupling the first generator to the engine comprises fitting the first generator to a gearbox of the engine, and wherein mechanically coupling the second generator to the engine comprises fitting the second generator to the gear box of the engine.

3. The method of claim 1, wherein applying power from the power source comprises closing a switch connected between the power source and the first generator and the second generator.

4. The method of claim 3, wherein applying power from the power source comprises adjusting a variable resistor connected between the power source and the first generator and second generator until the respective rotors rotate to a fixed position.

5. The method of claim 1, further comprising measuring an impedance across each respective phase to confirm phase alignment.

6. The method of claim 1, further comprising disconnecting the power source from the first generator and the second generator when the first generator and the second generator are in-phase.

7. The method of claim 1, wherein the power source is a battery external to the engine.

8. The method of claim 1, further comprising connecting a second power source to a second phase of the stator of at least one of the first generator and the second generator, and applying power from the second power source to the at least one of the first generator and the second generator to obtain a non-zero phase alignment between the first generator and the second generator.

9. A system for synchronizing at least two generators for an engine, the system comprising:
   a first generator;
   a second generator mechanically uncoupled from the engine;
   a power source connected in parallel to the first generator and the second generator across a same respective phase of a stator in the first generator and the second generator, the power source operable to apply power to the first generator and the second generator to align a respective rotor to the respective phase in each generator and cause the first generator and the second generator to be in-phase; and
   a gearbox to mechanically couple the second generator to the engine once the first generator and the second generator are in-phase.

10. The system of claim 9, further comprising a switching device connected between the power source and the first generator and second generator for applying the power to the first generator and the second generator.

11. The system of claim 10, further comprising a variable resistor connected between the power source and the first generator and second generator for modulating the power applied to the first generator and the second generator.

12. The system of claim 9, wherein the power source is a battery external to the engine.

13. The system of claim 9, wherein the first generator is mechanically coupled to the engine via the gearbox.

14. The system of claim 9, further comprising at least one impedance meter for measuring impedance across each respective phase of the stator to confirm phase alignment.

15. The system of claim 9, further comprising a second power source connected to a second phase of the stator of at least one of the first generator and the second generator, and operable to apply power to the at least one of the first generator and the second generator to obtain a non-zero phase alignment between the first generator and the second generator.

* * * * *